(12) United States Patent
Chun (10) Patent No.: US 7,318,258 B2
(45) Date of Patent: Jan. 15, 2008

(54) CLIPS HAVING INFLAMMABLE MEMBER INSIDE THEREOF

(75) Inventor: Hong-Gi Chun, Seoul (KR)

(73) Assignee: Huneed Technologies Co., Ltd., Dangjeong-dong, Gunpo-si, Gyeonggi-do (KR)

( * ) Notice: Subject to any disclaimer, the term of this patent is extended or adjusted under 35 U.S.C. 154(b) by 323 days.

(21) Appl. No.: 11/203,032

(22) Filed: Aug. 12, 2005

(65) Prior Publication Data

US 2006/0250263 A1 Nov. 9, 2006

(30) Foreign Application Priority Data

May 6, 2005 (KR) .................. 10-2005-0038114

(51) Int. Cl.
*A41F 1/00* (2006.01)

(52) U.S. Cl. .................. 24/602; 24/704.1; 24/115 F; 256/32; 256/33; 256/47; 256/48

(58) Field of Classification Search .................. None
See application file for complete search history.

(56) References Cited

U.S. PATENT DOCUMENTS 3,779,004 A * 12/1973 Gloeckler .................. 59/93
4,014,080 A * 3/1977 Caradec .................. 24/602
5,927,890 A * 7/1999 Job et al. .................. 403/2

* cited by examiner

*Primary Examiner*—Jack W. Lavinder
(74) *Attorney, Agent, or Firm*—Sheridan Ross P.C.

(57) ABSTRACT

The present invention relates to clips holding cables to form a predetermined pattern in a security fence and combusted with heat or impact from outside to cut off or destroy the cables, immediately raising an alarm.

18 Claims, 12 Drawing Sheets

CLIPS HAVING INFLAMMABLE MEMBER INSIDE THEREOF

CROSS-REFERENCE TO RELATED APPLICATION

This application claims priority to and the benefit of Korean Patent Application No. 10-2005-0038114 filed with the Korean Intellectual Property Office on May 6, 2005, the entire content of which is incorporated herein by reference.

BACKGROUND OF THE INVENTION (a) Field of the Invention

The present invention relates to clips holding a cable, and more particularly to clips holding a cable, which is built into a security fence in a pattern, for raising an alarm against intrusion or tampering by cutting off or damaging the cable in emergencies.

(b) Description of the Related Art

A security fence is a structure built to protect facilities (or areas). A conventional way of guarding facilities or areas has been to build a security fence around them and patrol this fence.

Another way was to equip the security fence with an optic cable and monitor the distortion of light, which flows through the optic cable to detect intrusion or tampering. This is well-known in a plurality of previous disclosures such as U.S. Pat. Nos. 4,275,294; 4,371,869; 4,399,430; 4,450,434; 4,558,308; 4,676,485; 4,680,573; 5,134,386; 5,416,467; 5,592,149; and Korean Patent Nos. 20-0205489, 20-0205490.

According to the conventional arts, an optic cable is built into a security fence in a zigzag pattern. The optic cable has a pattern smaller than the size of a man such that an intruder cannot get though the pattern without breaking it. In other words, an intruder cannot make a hole in the fence large enough to pass through without cutting off or damaging the optic cable. Any transformation or damage to the optic cable would distort the flow of light therein, raising an alarm.

Figure 1:
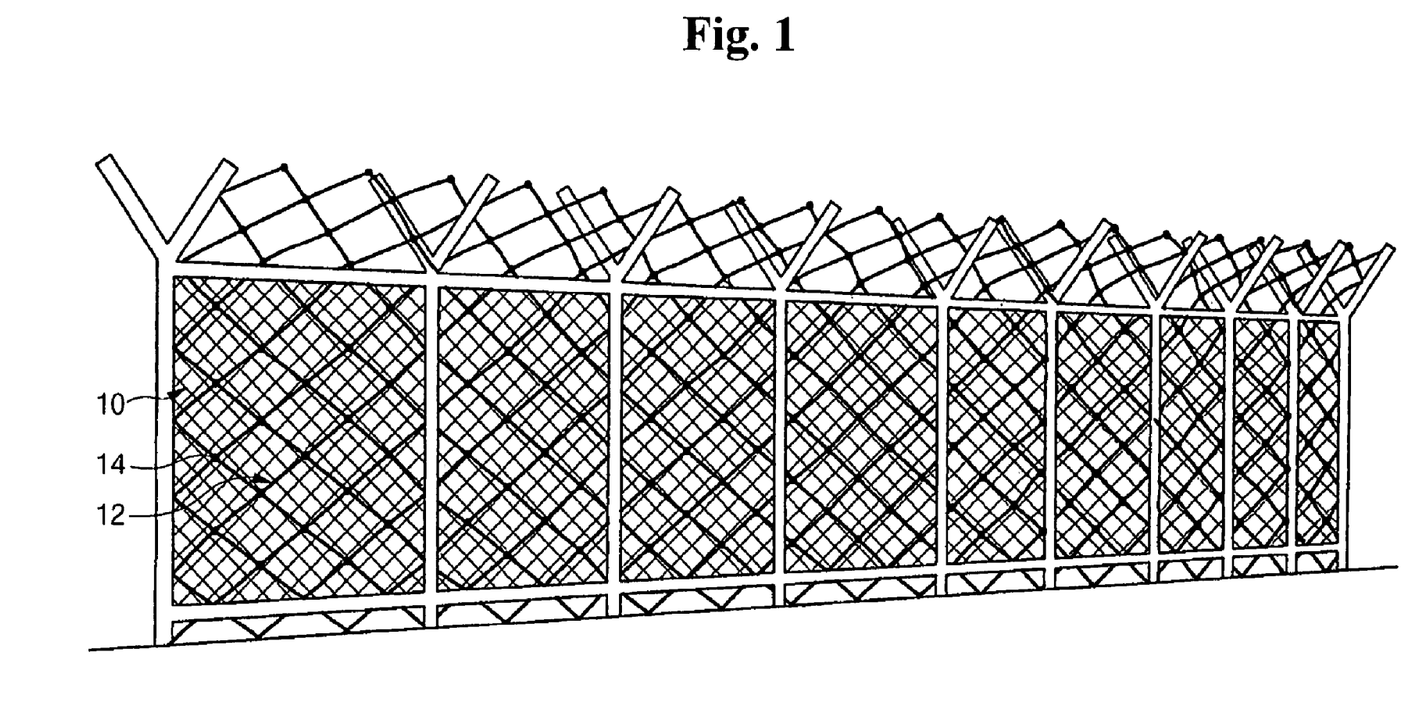
FIG. 1 shows a security fence installed with a fiber optic cable according to the conventional art.

FIG. 1 illustrates a security fence 10 installed with an optic cable 12 according to a conventional art.

As shown in FIG. 1, the optic cable 12 is installed on the security fence 10 in a zigzag pattern. Here, clips 14 are holding the optic cable in the zigzag pattern.

Figure 2:
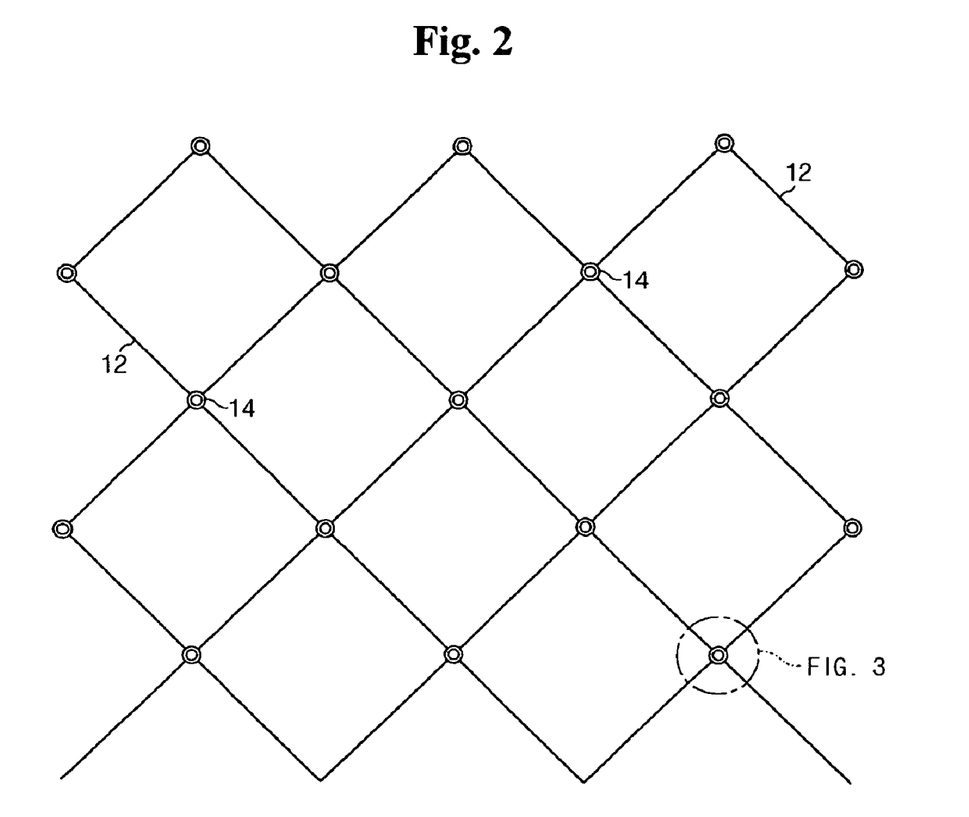
FIG. 2 is an enlarged view of a pattern formed with a fiber optic cable illustrated in FIG.1.
Figure 3:
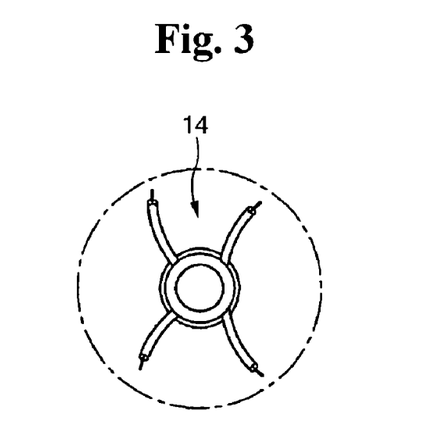
FIG. 3 is an enlarged view of a conventional clip holding the fiber optic cable to form the pattern of FIG. 2.
Figure 4:
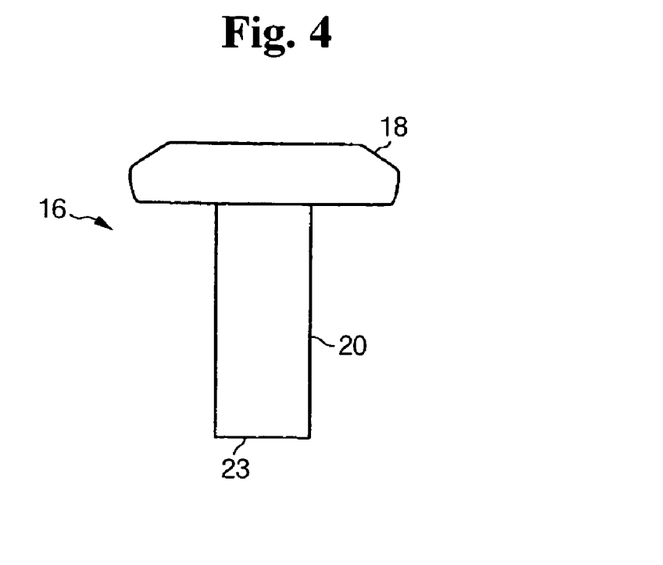
FIG. 4 is a side view of a first part of the clip of FIG. 3.

FIG. 2 is an enlarged view of the zigzag pattern of the optic cable 12, and FIG. 3 is an enlarged view of the clips 14 according to the conventional art. Henceforth, the clips 14 are illustrated in detail with reference to the accompanying drawings, FIGS. 4 to 6.

According to the conventional art, the clip 14 is basically composed of a first part 16 and a second part 17. The first part 16 comprises a disc-shaped portion 18 and a stem portion 20 (refer to FIG. 4). The first part 16 would substantially have a T-shaped cross section taken along its mid-line, as can be envisioned in FIG. 4.

Figure 5:
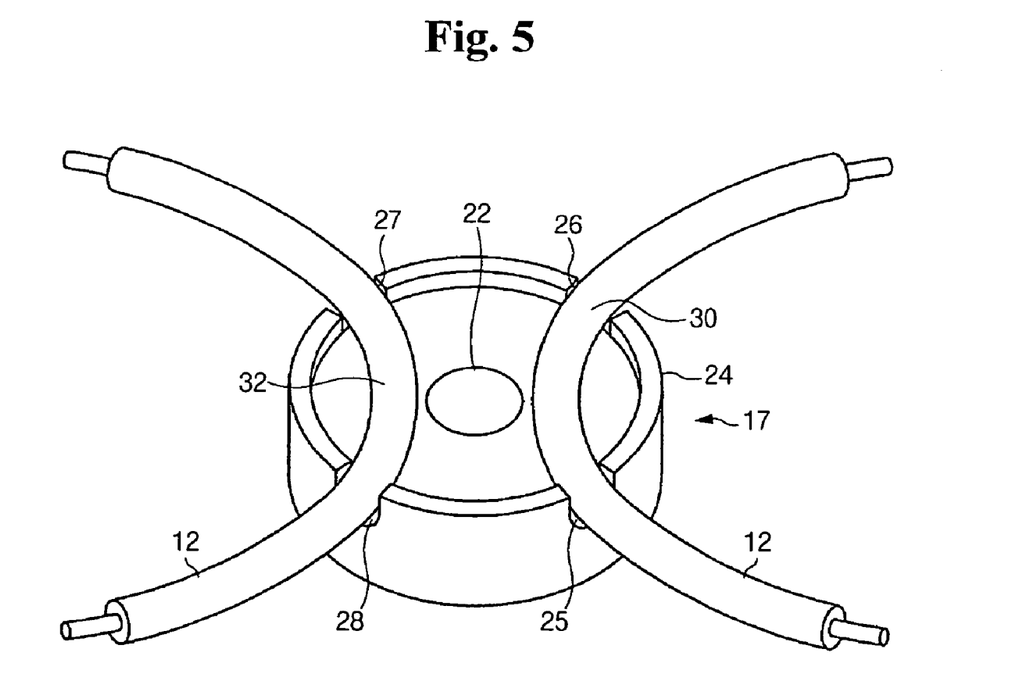
FIG. 5 is a perspective view of a second part of the clip of FIG. 3.

On the other hand, the second part 17 is generally disc-shaped and connected with the first part 16 (refer to FIG. 5). A hole 22 centrally located in the second part 17 is for accepting the stem portion 20 of the first part 16 and being connected therewith. The second part 17 also has a protrusion 24 over the external circumferential surface. The protrusion 24 has first, second, third, and fourth channels 25, 26, 27, and 28 passing therethrough.

In order to form a zigzag pattern, the first and second channels 25, 26 should be artificially installed with an optic cable 12 therethrough. The third and forth channels 27, 28 should be installed with another optic cable 12 therethrough.

Figure 6:
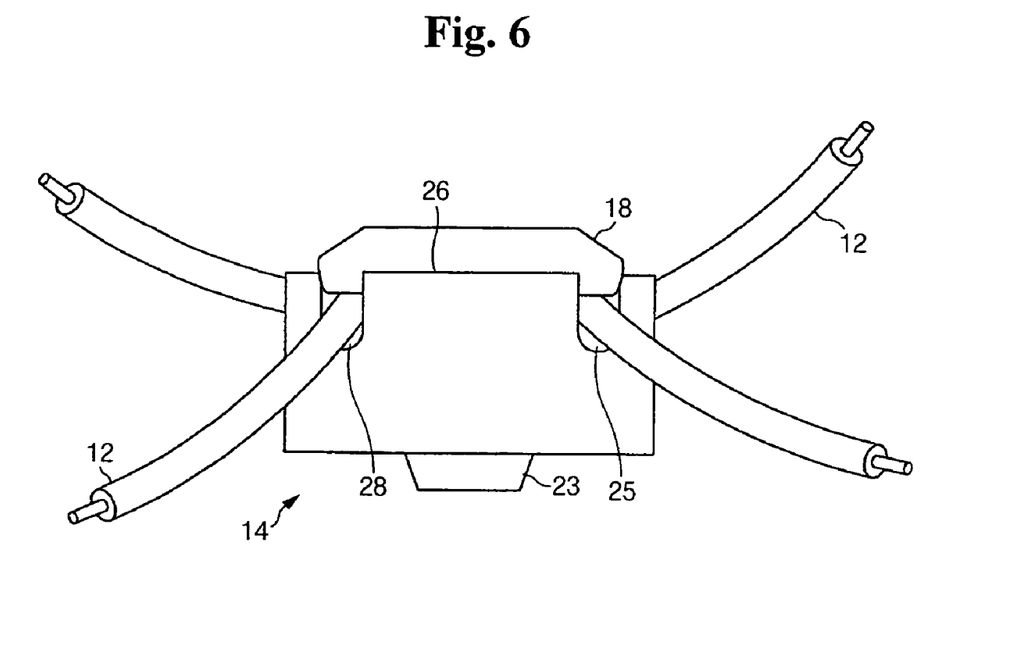
FIG. 6 is a side view of the first and second parts of FIGS. 4 and 5 in an assembled state.

Next, as illustrated in FIG. 6, the stem portion 20 of the first part 16 is manually interposed through a hole 22 centrally located in the second part 17. Then, an end 23 of the stem portion 20 of the first part 16 is flattened or deformed by riveting, or the like, to be connected with the second part 17.

However, this conventional clip has a drawback of hardly holding an optic cable in a pattern.

For example, the clip can be cumbersome to manually install, since the optic cable 12 must be fixed relatively shallow into the first through forth channels 25, 26, 27, and 28 of the second part 17, while riveting the first part 16 on the second part 17. In addition, the exposed open edges between the first and second parts 16, 17 can be exploited by a would-be intruder in an attempt to pry the first part 16 off from the second part 17, while gripping the second part 17 with a tool (e.g. locking pliers).

Another potential drawback is the exposure of the flattened end 23 of the stem portion 20. A would-be intruder could attempt to cut off the flattened end 23 of the stem portion 20, and if successful, the first part 16 could be disassembled from the second part 17.

If the would-be intruder could gently remove at least one clip 14 and separate the weave pattern of the optic cable 12, the would-be intruder might gain undetected access to secure facilities.

SUMMARY OF THE INVENTION

The present invention provides clips strongly holding a cable for a security fence in a predetermined pattern.

The present invention also provides clips designed to destroy a cable and immediately raise an alarm by combusting themselves when they receive heat or an impact.

The present invention provides a clip that fixes a pair of cables to form a pattern in a security fence, and the clip comprises a first part including a first structure and having a plurality of channels, a second part including a second structure that is occluded with the first structure, and a combustion member installed close to the cable accepted between the first and second parts and generating high heat against heat or impact.

The combustion member in the present invention can comprise igniting elements that can catch fire at low temperatures, firing elements that can increase the heat generated by the igniting elements, and heating elements that can maintain the heat increased by the firing elements for a predetermined time. The combustion member may be formed by layering these three elements in order.

Further, the combustion member is positioned to contact the cable.

The combustion member of the present invention can be formed at least one between at least a pair of the cables accepted between first and second parts. It can also include an insert member, which is assembled into the channels and supported by the second part when the first structure of the first part is occluded with the second structure of the second part.

Here, the insert member contains the combustion member therein.

The insert member in the present invention includes a plurality of legs connected with the channels and a hip connecting the legs to each other in the center. The hip has a hole accepting the combustion member in the center.

In addition, the first part includes a first recess, which is laid on the external surface of the hip of the insert member and formed like steps from the channels.

The insert member has jagged parts on the surface which is facing toward the cable when the insert member is assembled into the channels.

In addition, the present invention includes an adhesive agent, which can be applied to at least one of the plurality of channels.

Furthermore, the first structure of the first part in the present invention includes protrusions, and the second structure of the second part includes a second recess.

Here, the second recess is formed along the cylindrical circumference inside the second part.

Also, the present invention can use any cable, either an optic or a metal cable.

BRIEF DESCRIPTION OF THE DRAWINGS

The present invention will become more fully understood from the detailed description given hereinbelow together with the accompanying drawings which are given by way of illustration only, and thus, are not limits of the present invention, and wherein.

DETAILED DESCRIPTION OF THE EMBODIMENTS

An embodiment of the present invention will hereinafter be described in detail with reference to the accompanying drawings.

Figure 7:
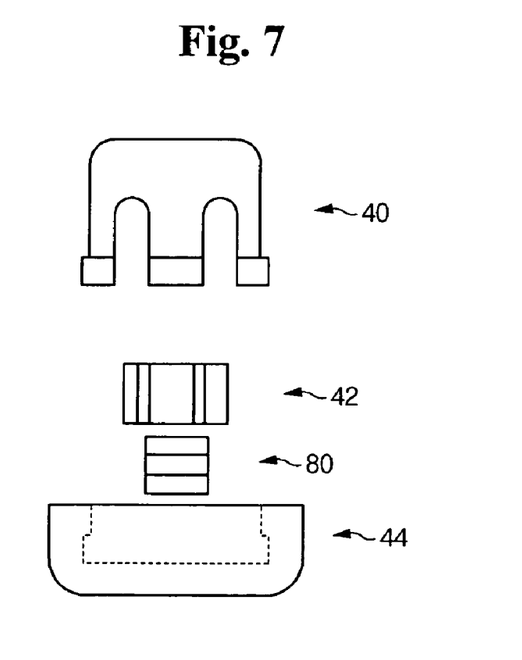
FIG. 7 is a perspective exploded view of a clip according to an embodiment of the present invention.

FIG. 7 is a side exploded view of a clip according to an embodiment of the present invention. As shown in FIG. 7, the clip includes a first part 40, an insert member 42, a combustion member 80, and a second part 44. With reference to FIGS. 7 to 11, the first part 40 has the appearance of a circular disc when viewed from its top (refer to FIG.9).

A bottom of the first part 40 (refer to FIGS. 8 and 10) is more complex in shape than the top appearance. First and second curved channels 46, 48 form a geometric cord at the bottom of the first part 40. Cables 12 are accepted into the first and second channels 46, 48. The cables 12 are fabricated of a fiber optic cable in this embodiment of the present invention, but a metal, such as iron and copper, can also be used. The present invention covers various types of cables. In addition, the cables are, in fact, partially accepted into the channels when described as 'accepted.'

The first and second channels 46, 48 are respectively formed as slits on an external circumferential protrusion 56. Each first and second channel 46, 48 is formed as a round shape with a predetermined curvature. The curvature is related with the characteristics of the fiber optic cable 12. In other words, the fiber optic cable 12 is formed within the range of the radius of curvature allowing light to be transmitted without distorting a signal.

In addition, the first and second curved channels 46, 48 meet each other in a central space 50. Accordingly, the first and second curved channels 46, 48 form an embedded X shape at the bottom of the first part 40.

These first and second channels 46, 48 are formed as a pair to face each other, so that the fiber optic cables 12 form a zigzag pattern as illustrated in the drawings, but the present invention is not limited thereto. For example, the first and second channels 46, 48 can be shaped as a cross shape (refer to FIG. 22), so that the fiber optic cables 12 can form a lattice pattern.

Figure 8:
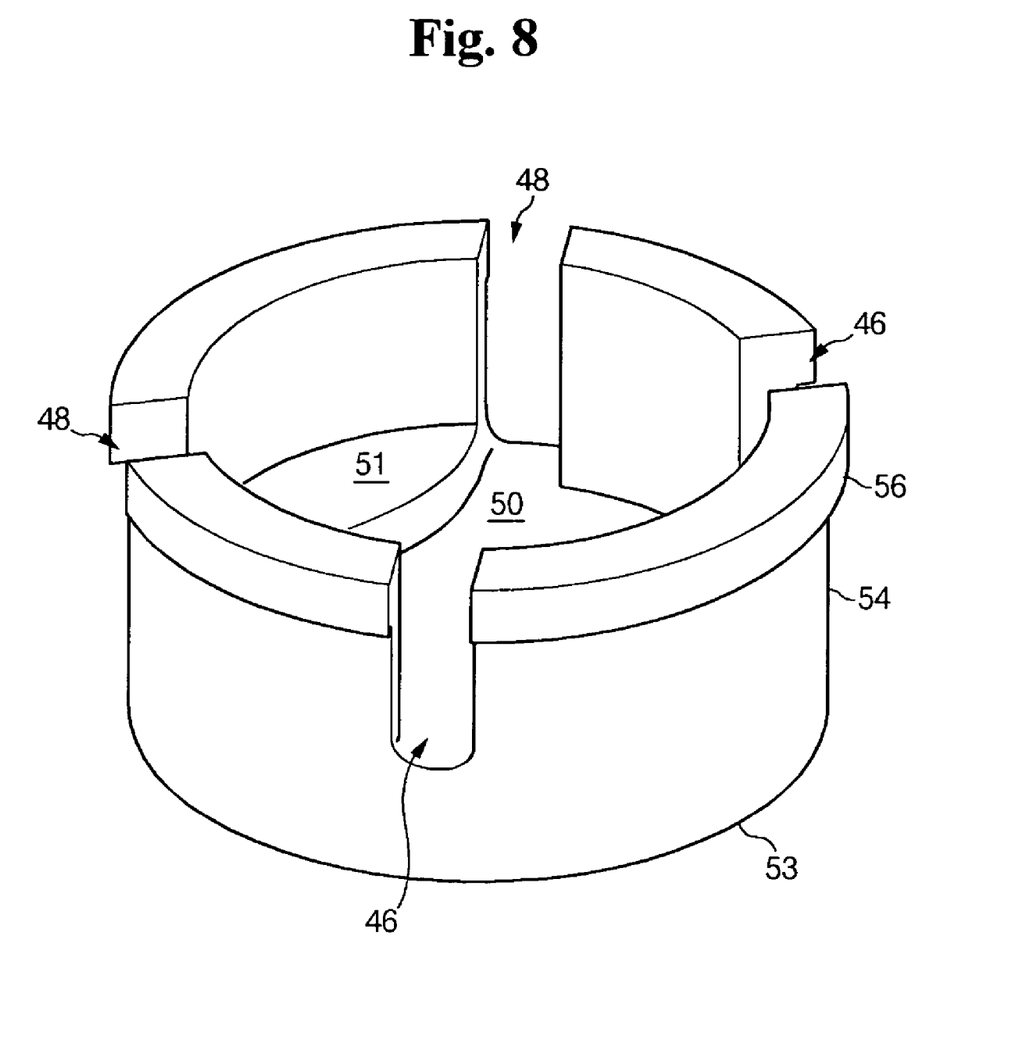
FIG. 8 is a perspective view of a bottom of a first part of the clip illustrated in FIG. 7.
Figure 9:
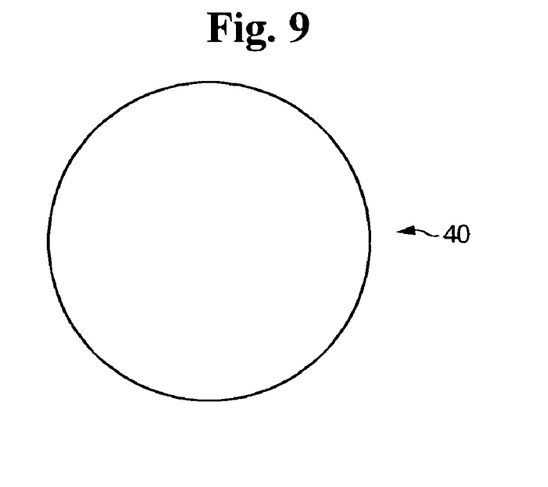
FIG. 9 is a top plan view of the first part of the clip illustrated in FIG. 7.
Figure 11:
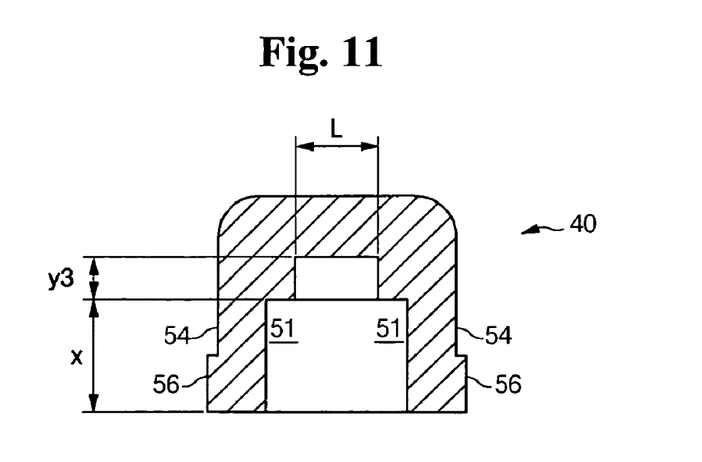
FIG. 11 is a cross sectional view taken along a line XI-XI in FIG. 10.

On the other hand, the first part 40 includes engagement walls 54, which are formed extended upward from the bottom 53. As shown in FIGS. 7, 8, and 11, the engagement walls 54 are formed at right angles with the bottom 53.

On the other hand, a first recess 51 of the first part 40 is formed like steps between the engagement walls 54 and the first and second channels 46, 48. Referring to FIGS. 8 and 11, the first and second channels 46, 48 are hollowly formed to accept the fiber optic cables 12 in a central space 50, and the first recess 51 is formed like steps from the channels 46, 48 toward the engagement walls 54 facing each other.

Figure 10:
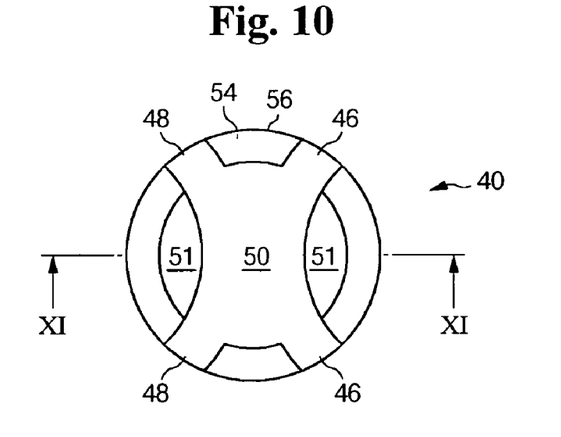
FIG. 10 is a bottom view of the first part of the clip illustrated in FIG. 7.

Also, protrusions 56 are formed at the edge of the engagement walls 54. The protrusions 56 extend outward from the cylindrical first part and are illustrated as forming an angle of approximately ninety degrees with the engagement walls 54. As best illustrated in FIG. 10, the shape of the engagement walls 54 is approximately circular in a bottom view. Also, the shape of the protrusions 56 is approximately circular in a bottom view.

In a preferred embodiment, the first part 40 is formed of a metal. However, it can be formed of other materials, such as a hardened ceramic or plastic. Also, the engagement walls 54 can be formed at a predetermined angle with the protrusions 56 and with a predetermined shape.

Figure 12:
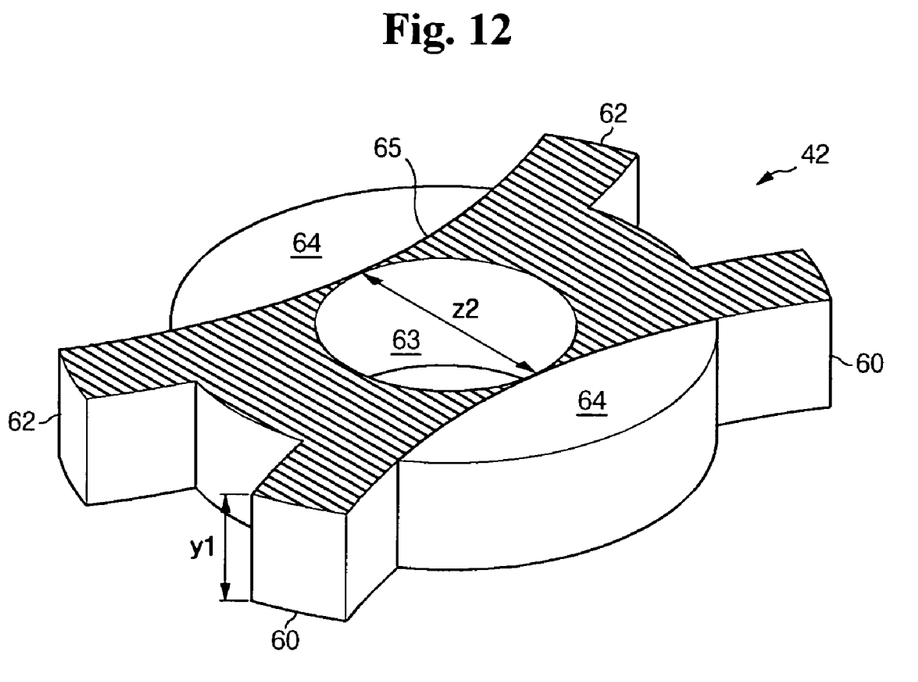
FIG. 12 is a perspective view of an insert member of the clip in FIG. 7.
Figure 13:
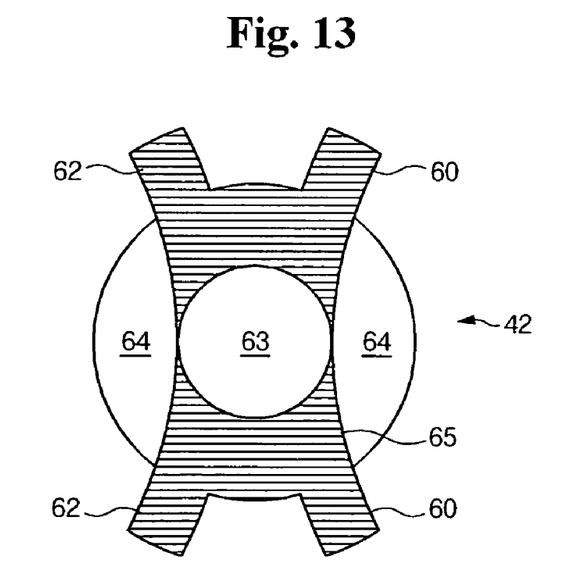
FIG. 13 is a top plan view of the insert member in FIG. 12.

FIGS. 12 and 13 illustrate an insert member 42. In the preferred embodiment, the insert member 42 has first and second legs 60, 62. The first leg 60 is joined with the second leg at a hip 64. The hip 64 is formed to have a predetermined size, and illustrated is a hip with a disk shape in the drawings. Further, a hole 63 is formed in the center of the hip 64. Ragged parts 65 are formed on the first and second legs 60, 62 of the insert member 42 and on the hip 64 extended between the legs 60 and 62.

The size of the first leg 60 is the same as or smaller than that of the first channel 46 connected therewith. Likewise, the size of the second leg 62 is the same as or smaller than that of the second channel 48 connected therewith. Also, the hip 64 has a size fitting with the central space 50 restricted by the engagement walls 54.

As shown in FIG. 12, the insert member 42 is formed to be y1 high. The height y1 is shorter than the height x of the first and second channels 46, 48 illustrated in FIG. 11. Also, the height y1 is substantially the same as the height y2 of the first recess 51. Therefore, the actual height x of the first and second channels 46, 48 is the same as the sum of the height y2 of the first recess and y3. Here, y3 is the height to the first recess 51 from the bottom of the first part. The height y3 is the same as or smaller than the diameter of the optic cable 12.

For example, if the diameter of the optic cable 12 is 3 mm, the height y1 of the insert member 42 is 6 mm and the height x of the first and second channels is 8.5 mm. Here, the insert member 42 can be formed of a plastic, ceramic, or metal.

Figure 14:
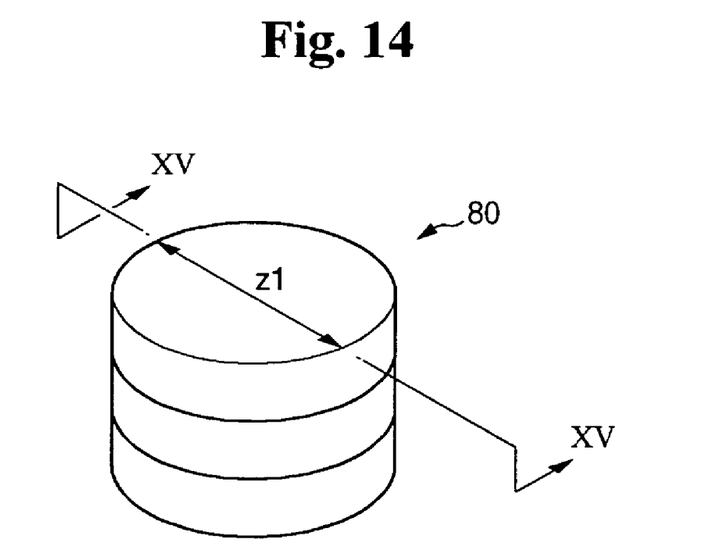
FIG. 14 is a perspective view of the combustion member in FIG. 7.
Figure 15:
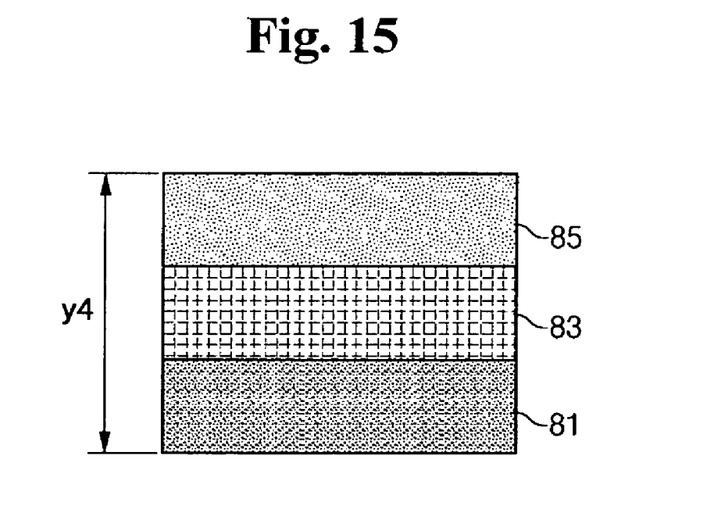
FIG. 15 is a cross sectional view taken along a line XV-XV in FIG. 14.

FIGS. 14 and 15 illustrate a combustion member 80. This combustion member 80 has a cylindrical shape and its cross section has a rectangular shape. It is inserted and connected into the hole 63 in the insert member 42. Accordingly, the hole 63 of the insert member 42 and the combustion member 80 should be fabricated to have the same shape. As shown in the drawings, the preferable embodiment provides the hole 63 and combustion member 80 formed to have the same cylindrical shape.

As illustrated in FIGS. 14 and 15, the combustion member 80 has a height of y4 and a diameter of z1. This height y4 is the same as the height y1 of the insert member or the height y2 of the first recess 51. Further, the diameter z1 of the insert member 42 is the same as z2 of the hole 63. In addition, it is preferable that the diameter z1 is bigger than the width L of the first part 40. This width L substantially covers the diameters of two fiber optic cables.

The combustion member 80 in this embodiment of the present invention preferably includes igniting elements 81, firing elements 83, and heating elements 85.

The igniting elements 81 play a role of catching fire when the combustion member 80 receives heat or an impact from outside and they comprise a mixture, which is mainly composed of phosphorus (P). Here, the phosphorus includes white phosphorus, red phosphorus, yellow phosphorus, phosphorus sulfide, and the like. Igniting elements 81 mainly comprising phosphorus sulfide are prepared by mixing materials such as phosphorus trisulfide, potassium chlorate, diatomite, glass powder, zinc oxide, and potassium dichromate with a binder and then solidifying the mixture. The white, red, and yellow phosphorus are chemically active and easily combust at low temperatures (about 50° C.) in air, turning into an oxide of $P_2O_6$. The white, red, and yellow phosphorus are also directly compounded with most elements, except for carbon, nitrogen, and the like, and fiercely react with them, especially with halogen, sulfur, oxygen, and the like.

Next, the firing elements 83 mainly comprise $C_2F_4$, Ti, and the like, and play a role of increasing the heat generated by the igniting elements 81 up to about 3,500° C.

In addition, the heating elements 85 play a role of steadily maintaining the heat diffused by the firing elements 83 and start being combusted by the reaction heat thereof. The heating elements 85 are mainly composed of Ti and C.

The combustion member 80 is formed by layering the aforementioned three elements in order and can also be wrapped with a capsule and the like to prevent the permeation of moisture. In addition, the combustion member 80 is formed by highly pressuring the igniting, firing, and heating elements together to have a predetermined strength or by mixing all materials comprising the igniting, firing, and heating elements.

Figure 16:
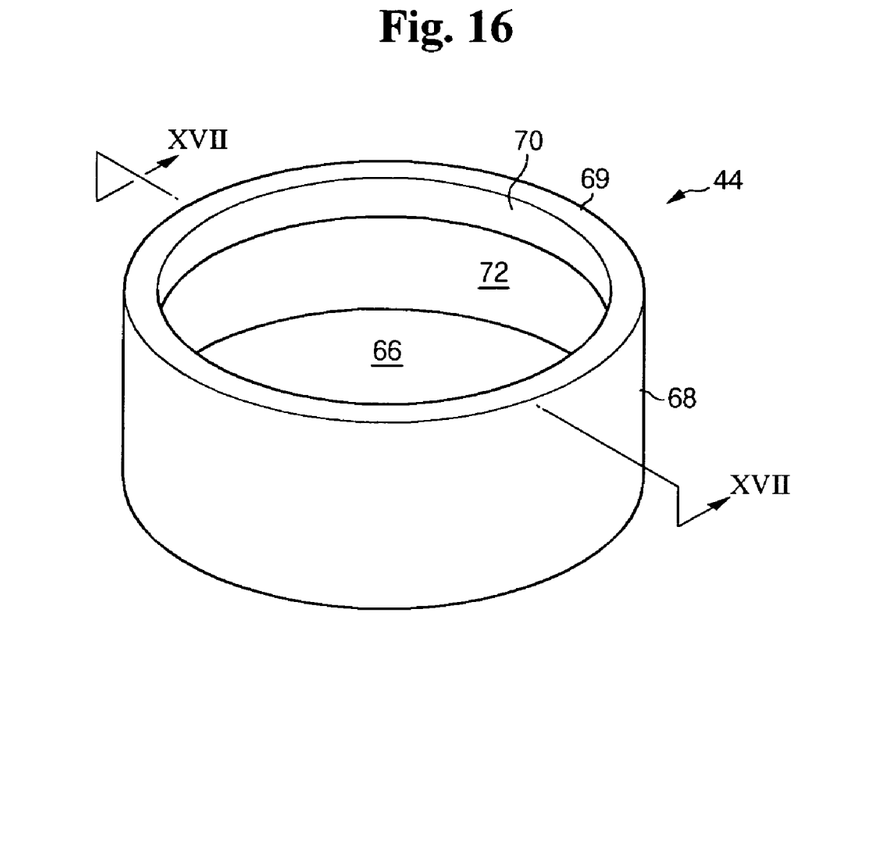
FIG. 16 is a perspective view of a second part of the clip in FIG. 7.
Figure 17:
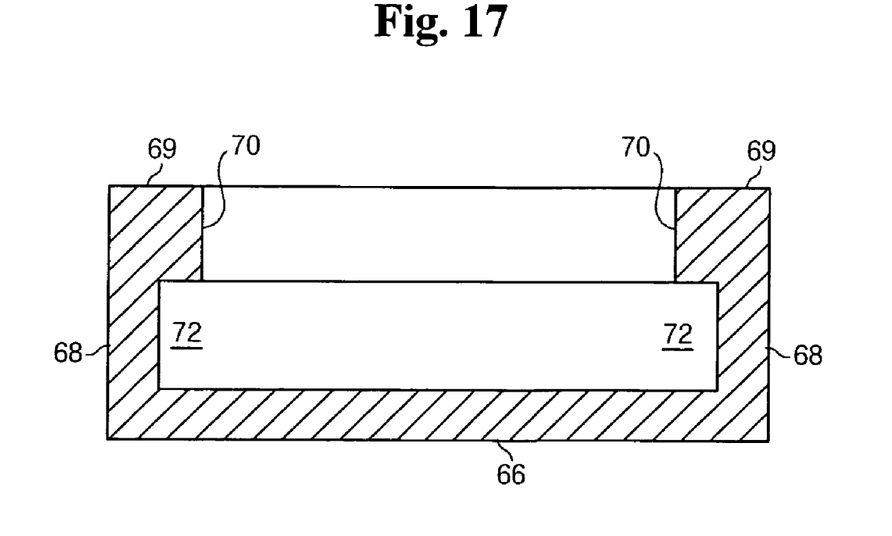
FIG. 17 is a cross sectional view taken along a line XVII-XVII in FIG. 16.

FIGS. 16 and 17 illustrate a second part 44. The second part 44 looks like a circular disc when viewed from a bottom 66 thereof. The most outer engagement wall 68 is extended upward from the bottom 66. It reaches a first ledge 69 formed like a step. A lip 70 is formed extended inward from the first ledge 69. Accordingly, a second recess 72 is formed under the lip 70.

According to the preferable embodiment, the second part 44 is formed of a metal. However, this second part 44 can be formed of other materials, such as a hardened ceramic or plastic.

Figure 18:
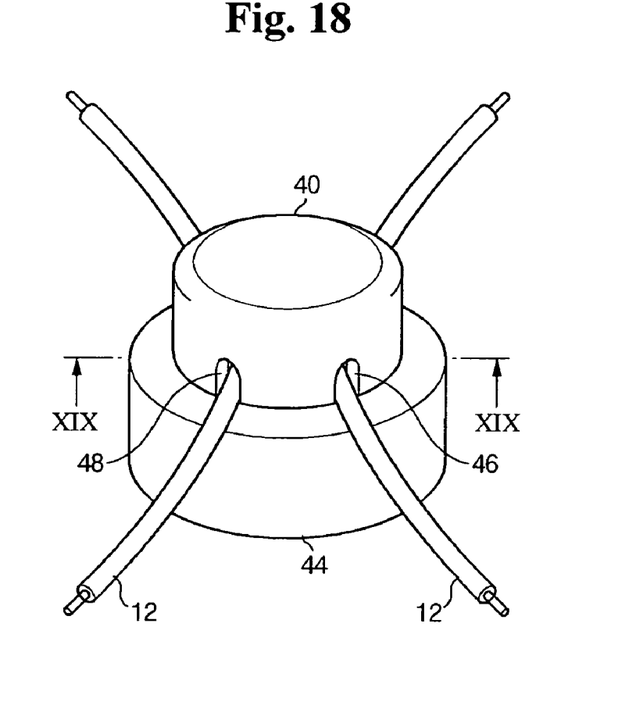
FIG. 18 is a side view of the first part, the insert member, the combustion member, and the second part in an assembled state.
Figure 19:
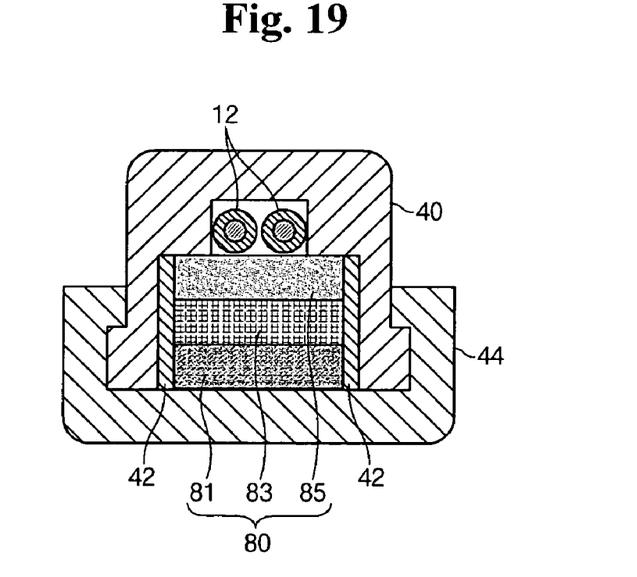
FIG. 19 is a cross sectional view taken along a line XIX-XIX in FIG. 18.
Figure 20:
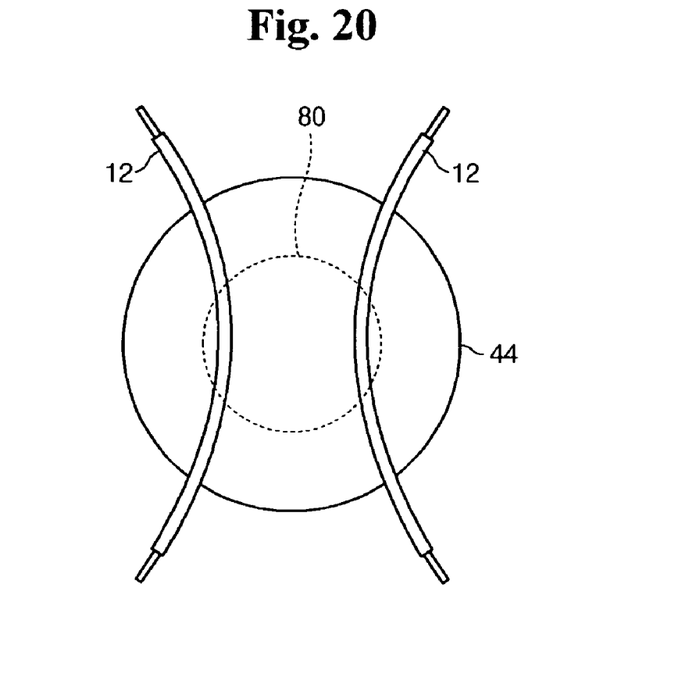
FIG. 20 is a top plan view of the position of the combustion member and the optic cable.

Henceforth, discussed is a method of assembling the first part 40 with the optic cable 12, the insert member 42, the combustion member 80, and the second part 44 with references to FIGS. 18, 19, and 20.

First of all, the insert member 42 is inserted to fit into the hole 63 of the combustion member 80. The diameter z1 of the hole 63 is substantially the same as z2 of the combustion member 80 and the combustion member 80 is fixed into the hole 63.

Next, the fiber optic cable 12 is interposed into the first channel 46 and likewise, another fiber optic cable 12 is interposed into the second channel 48. Here, the fiber optic cables 12 are installed down in the central space 50 at the bottom of the first part 40.

Then, the insert member 42 is assembled with the first part 40 to fix the fiber optic cable 12. The first leg 60 of the insert member 42 is inserted into and connected with the first channel 46 of the first part 40, and likewise, the second leg 60 is inserted into and connected with the second channel 48 thereof. Here, the insert member 42 is placed with its ragged parts facing toward the fiber optic cable 12. As a result, the hip 64 of the insert member 42 is installed with the first recess 51 of the first part 40 and connected therewith. The combustion member 80, which is installed on the hip 64 of the insert member 42, reaches and contacts the optic cable 12.

An adhesive is preferably used to fix the optic cables 12 to the first and second channels 46, 48.

Next, the second part 44 is assembled. The second part 44 is inserted with the bottom 66 thereof facing toward the insert member 42. Then, the first and second parts 40, 44 are pressured to become closer by using a tool like pliers. When pressured, the insert member 42 has pressure on the optic cables 12 toward the bottom of the first part 40.

Finally, the first structure, such as the engagement walls 54 and protrusions 56, of the first part 40 is closely occluded and strongly connected with the second structure, such as the lip 70 and the second recess 72, of the second part 44.

In general, the diameter of the fiber optic cable 12, which is used to form a pattern in a security fence, is about 3 mm. The height y1 of the insert member 42 is about 6 mm, and the depth x of the first and second channels 46, 48 is about 8.5 mm. Accordingly, the fiber optic cable 12 can have a pressure. According to the preferable embodiment, the sizes of x and y are set to pressure about 15 to 20% of the fiber optic cable 12. The fiber optic cable is tightly connected with the clip due to the pressure, and the adhesive also helps strengthen their bonding. In addition, since the combustion member 80 is positioned in the center of the insert member 42, which is also in the central space of the first part 40, and its diameter z1 is wider than the width L taken by two fiber optic cables 12, it is installed in touch with the fiber optic cables 12 thereon.

On the other hand, x and y are provided with particular values to illustrate this embodiment of the present invention but can vary, depending on the size of the fiber optic cable 12.

Since the first and second structures are designed to be linked in this embodiment of the present invention, the protrusions 56 of the second part 44 are connected with the recess 72 of the first part 40. However, it is understood that there are other linking ways. For example, the protrusions 56 of the first part 40 can be formed on the second part 44 and the recess 72 of the second part 44 can be formed in the first part 40.

On the other hand, as illustrated until now, the clips 14 of this embodiment of the present invention, connected with the fiber optic cable 12, very sensitively react against heat or impact. For example, if a would-be invader attempts to break into a secure area by cutting off the clips 14 with a tool like a grinder, a fricative heat generated by the would-be invader would be immediately transferred to the igniting elements 81 of the combustion member 80. Then, the igniting elements 81 would be immediately combusted, burning the firing elements 83 neighboring therewith. Next, the firing elements 83 would generate high heat of about 3,500□, which would be maintained by the heating elements 85 for a while. Accordingly, the high heat generated by the combustion member 80 would immediately cut off or destroy the fiber optic cable 12 neighboring therewith, rapidly raising an alarm and fundamentally intercepting the would-be invader.

On the other hand, the aforementioned embodiment illustrates that the combustion member 80 is installed right on top of, or beneath, the fiber optic cable, but the present invention is not limited thereto. For example, as shown in FIGS. 21 and 22, the combustion member 80 can be neighbored next to the optic cable 12.

Figure 21:
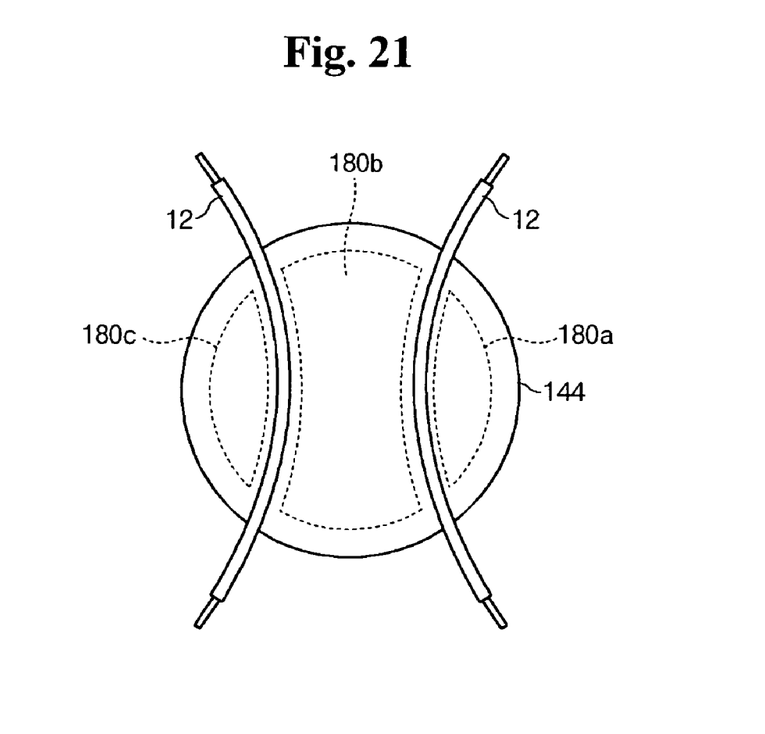
FIG. 21 is a top plan view of another position of the fiber optic cable and the combustion member.
Figure 22:
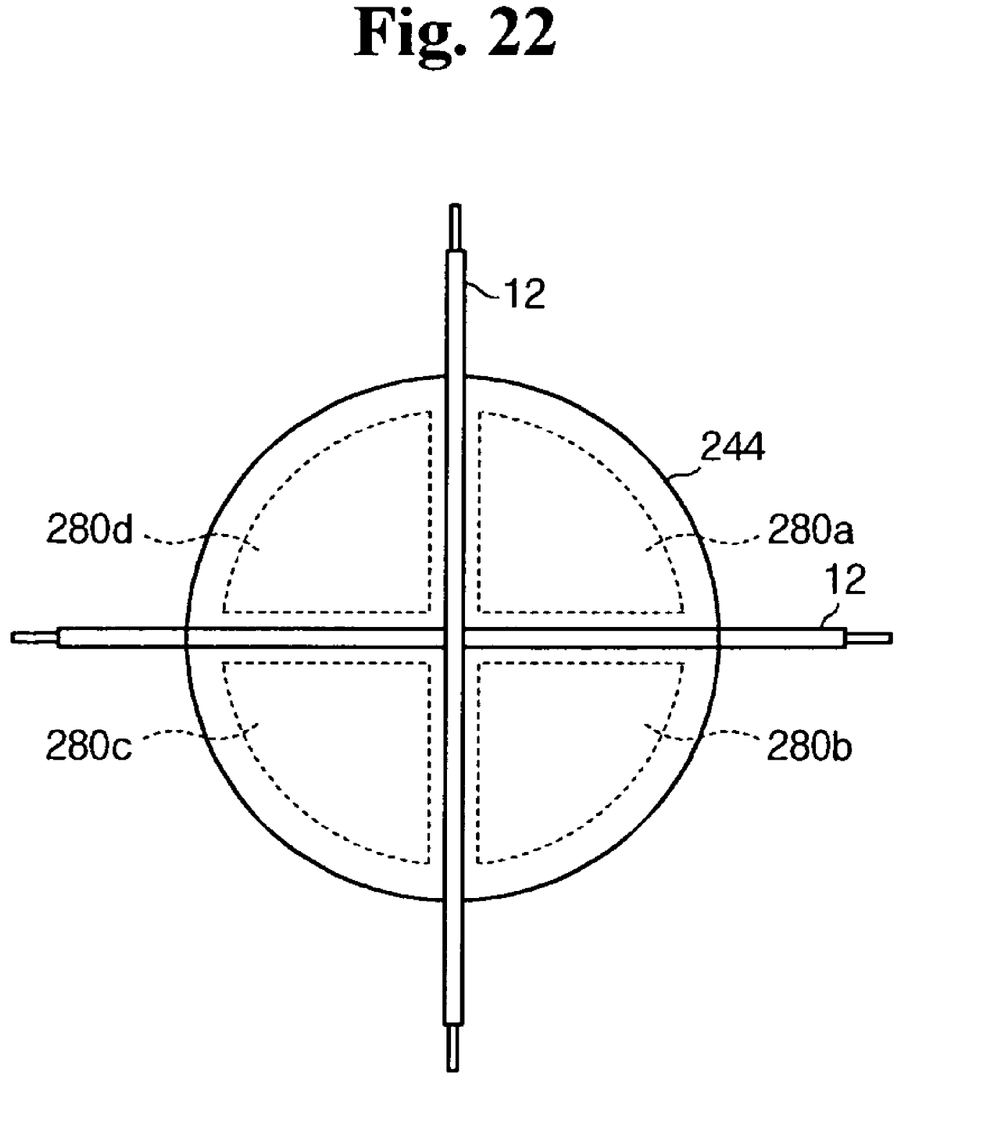
FIG. 22 is a top plan view of the third position of the fiber optic cable and the combustion member.

FIG. 21 shows a case of installing a plurality of combustion members 180a, 180b, and 180c between the fiber optic cables 12 when the fiber optic cables 12 are formed in a zigzag pattern. This time, the clip 14 would also be cut off or destroyed, because any impact would be transferred to the combustion member 80 if the clip receives the impact. On the other hand, FIG. 22 shows a case of installing a plurality of combustion members 280a, 280b, 280c, and 280d between the fiber optic cables 12 when the fiber optic cables 12 are formed in a lattice pattern.

In conclusion, according to the present invention, a clip and a cable are so strongly connected to each other that they are hard to remove or take off from each other. The harder the clip is to remove, the harder it is for a would-be invader to remove and the higher the possibility of destroying the clip and raising an alarm. In other words, the harder the clip is to remove, the more time it takes to remove the clip and the higher the possibility the invader can be caught.

In addition, the clip is formed of a metal with high strength and tensile strength. If the clip is fabricated of the above metals, it is hard to take off from the cable even with a tool which can generate pressure, like pliers, or which can cut, like a bolt cutter.

Furthermore, the clip formed of a metal can transfer heat to a cable due to the high conductivity thereof. Therefore, if a would-be invader attempts to destroy a clip with heat or an electric cutter, the clip can highly conduct the heat and bend or destroy a cable, raising an alarm.

In addition, since a clip of the present invention includes a combustion member, the combustion member can work against any attempts to remove the clip from a cable by destroying the cable to raise an alarm against an invader or to detect his location.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clip for holding at least a pair of cables to form a pattern in a security fence, said clip comprising:
   a first part including a first structure and having a plurality of channels for accepting the cables;
   a second part including a second structure and engaging with the first structure; and
   a combustion member installed to neighbor the cables accepted between the first and second parts and generating high heat against heat or impact.

2. The clip of claim 1, wherein the combustion member comprises igniting elements which fire at low temperature, firing elements which can increase the heat generated by the igniting elements, and heating elements which can maintain the increased heat for a predetermined time.

3. The clip of claim 2, wherein the combustion member is formed by the igniting, firing, and heating elements in order.

4. The clip of claim 1, wherein the combustion member is positioned to contact the cables.

5. The clip of claim 1, wherein the combustion member is formed at least one between at least a pair of the cables accepted between the first and second parts.

6. The clip of claim 1, further comprising an insert member which fits into at least one of said channels, and supports the second part when the first structure of the first part engages with the second structure of the second part.

7. The clip of claim 6, wherein the insert member contains the combustion member therein.

8. The clip of claim 6, wherein the insert member comprises a plurality of legs that fit into the channels and a hip connecting the legs to each other in the center.

9. The clip of claim 8, wherein the hip has a hole in the center to accept the combustion member.

10. The clip of claim 8, wherein the first part has a first recess, which is laid on the external surface of the hip of the insert member.

11. The clip of claim 10, wherein the first recess of the first part is formed like a step from the channels.

12. The clip of claim 6, wherein the insert member has a ragged part on the surface.

13. The clip of claim 12, wherein the insert member is assembled into the channels with the ragged part facing toward the cables when inserted into the channels.

14. The clip of claim 1, further comprising an adhesive agent applied to at least one channel.

15. The clip of claim 1, wherein the first structure of the first part has protrusions and the second structure of the second part has a second recess.

16. The clip of claim 15, wherein the second recess of the second part is formed along the internal circumferential cylinder of the second part.

17. The clip of claim 1, wherein the cable is a fiber optic cable.

18. The clip of claim 1, wherein the cable is formed of a metal.

* * * * *